United States Patent
Niu et al.

(10) Patent No.: US 7,596,104 B2
(45) Date of Patent: Sep. 29, 2009

(54) PASSIVE OPTICAL NETWORK SYSTEM AND METHOD OF THE MASTER CONFIGURING THE SLAVES IN THE SYSTEM

(75) Inventors: Lehong Niu, Shenzhen (CN); Hai Gao, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 393 days.

(21) Appl. No.: 11/610,153

(22) Filed: Dec. 13, 2006

(65) Prior Publication Data
US 2007/0263656 A1 Nov. 15, 2007

(30) Foreign Application Priority Data
May 15, 2006 (CN) .................... 2006 1 0080542

(51) Int. Cl.
*H04J 1/16* (2006.01)
*H04L 12/28* (2006.01)
(52) U.S. Cl. .................... 370/278; 370/252; 398/168
(58) Field of Classification Search ............... 398/38, 398/71, 58, 168; 370/252, 278
See application file for complete search history.

(56) References Cited
U.S. PATENT DOCUMENTS
2003/0137975 A1* 7/2003 Song et al. ............... 370/353
2003/0180049 A1* 9/2003 Park ........................... 398/72
2006/0228113 A1* 10/2006 Cutillo et al. ............. 398/71
2007/0140691 A1* 6/2007 Gao et al. .................. 398/38

FOREIGN PATENT DOCUMENTS
| CN | 1496064 | 5/2004 |
| CN | 1674471 | 9/2005 |
| KR | 20040026271 | 3/2004 |

OTHER PUBLICATIONS
Huawei Technologies Co., Ltd.; PCT/CN2007/001446; PCT International Search Report; Aug. 9, 2007; 4 pgs.
Huawei Technologies Co., Ltd.; PCT/CN2007/001446; PCT Written Opinion; Aug. 9, 2007; 4 pgs.

* cited by examiner

*Primary Examiner*—John Pezzlo
(74) *Attorney, Agent, or Firm*—Conley Rose, P.C.; Grant Rodolph

(57) ABSTRACT

The present disclosure provides a method for the master to configure the slaves for use in a passive optical network (PON) system, comprising: the slaves generating a managed entity (ME) Support List ME based on their individual hardware configuration; the master obtaining the ME Support List ME; and the master configuring the slaves based on this list. The technical solution of the present disclosure allows speeding up of the optical network terminal (ONT) service clearance time by quickly identifying incompatibility of the optical line terminal (OLT) with the ONTs.

21 Claims, 3 Drawing Sheets

PASSIVE OPTICAL NETWORK SYSTEM AND METHOD OF THE MASTER CONFIGURING THE SLAVES IN THE SYSTEM

CROSS-REFERENCE TO RELATED APPLICATIONS

This application is claiming priority of Chinese Application number 200610080542.X filed May 15, 2006, entitled "A Passive Optical Network System and Method of the Master Configuring the Slaves in the System," which application is incorporated by reference herein in its entirety.

BACKGROUND

The present disclosure relates to optical network technology, and more particularly to a passive optical network (PON) system in the optical access network, and a method for the master to configure the slaves in the system.

Currently there are mainly two broadband access technologies, e.g. copper cable-based access technology, such as various kinds of digital subscriber loop (DSL) technologies, and optical access technology. The access network that is implemented with optical access technology is called an optical access network (OAN).

The passive optical network (PON) is one of the commonly used technologies for implementing the OAN. The PON technology is a point-to-multipoint optical access technology, and the composition of a PON is shown in FIG. 1. The PON system comprises an optical line terminal (OLT), an optical distribution network (ODN) and an optical network unit (ONU), wherein the OLT provides a serial network interface (SNI) for the OAN to connect to one or more ODNs. The ODN is a passive optical dividing component that transports downstream data from the OLT to individual ONUs, and gathers and transports the upstream data from the ONUs to the OLT. The ONU provides the OAN with a user network interface (UNI) and connects to the ODN. An ONU that also provides user port functions, such as an Ethernet user port or a Plain Old Telephone Service (POTS) user port, is called an optical network termination (ONT).

The Gigabit PON (GPON) is one type of PON technology, the standard for which defines a configuration transfer channel called an ONU Management and Control Interface (OMCI). The OMCI channel is established between the OLT and the ONTs when the ONTs register with the OLT. The OMCI is a master-slave management protocol wherein the OLT is the master and the ONTs are the slaves. The OLT can control a plurality of ONTs that are connected to it.

In the OMCI protocol, data on the management of the ONTs by the OLT are abstracted into a protocol-independent Management Information Base (MIB). The basic information unit of the MIB is the managed entity (ME). Depending on the configurations of the ONTs, the OMCI may define that the OLT as controlling the ONTs' various MEs and the ONTs implement, under the control of the OLT, the configuration management function for various MEs.

In the prior art, MEs are created in two ways:

1. At the time the ONT is initialized or has a change in hardware, such as plugging or unplugging a board or card, the ONT determines, based on its own hardware configuration, the number of ME instances and specific attribute value for each ME, and automatically creates the ME instances. This method is associated with the hardware configuration for the ONT.

2. The OLT, based on the needed service clearance, prompts the ONT to create the ME instances through the OMCI Create message, where the number of ME instances and the specific attribute value for each ME is configured by the OLT. This method is associated with the service configuration for the ONT.

Although the ITU-T G983.2 standard defines various MEs for the ONTs managed by the OLT, the implementation class for various MEs, and the GPON protocol numbers the ME classes to facilitate configuration by the OLT, the OLT is unable to automatically know whether a particular ME is supported by an ONT before it configures the ONT because the service supported by each ONT may vary from one another. Therefore, the OLT has to send a service-relevant ME Create message to the ONTs one by one, and the OLT determines that the service is not supported if a failure is returned. This method of determining whether an ONT supports a particular ME with messaging attempts is inefficient for the OLT to communicate with the ONTs and even more so for the OLT to further control the ONTs.

SUMMARY

The present disclosure provides a passive optical network (PON) system and a method for the master to configure the slaves in the system that addresses the problem with the existing technologies where the master (the OLT) is unable to obtain the ME Support List ME for the slaves before it configures the slaves, resulting in poor communication between the two.

The method of the present disclosure comprises:

A. the slaves generating the ME Support List ME based on their individual hardware configuration; and B. the master obtaining the ME Support List ME from the slaves; and C. the master configuring the slaves based on the ME Support List ME.

In the present method, the Step B comprises:

B1. the slaves automatically reporting, without being asked, the ME Support List ME to the master.

In the present method, the Step B comprises:

B1'. the master sending a command to the slaves asking for the ME Support List ME; and B2'. the slaves reporting the ME Support List ME to the master in response to the command of Step B1'.

In the present method, the Step B comprises:

B1". the master directly getting the ME Support List ME from the slaves.

In the Step B and Step C of the present method, communication between the master and the slaves is made via passive optical dividing components.

The present disclosure further provides a PON system comprising a master and at least two slaves controlled by the master wherein each of the slaves comprises:

a master instruction receiving unit for receiving instructions from the master;

an ME Support List ME generating unit for generating the ME Support List ME based on the hardware configuration of the slave; and an information reporting unit for reporting the ME Support List ME generated by the ME Support List ME generating unit to the master in response to the instructions received by the master instruction receiving unit.

The master comprises:

an ME Support List ME reading unit for reading the ME Support List ME generated by the slaves.

The master further comprises:

an ME Support List ME receiving unit for receiving the ME Support List ME from the information reporting units of the slaves.

The master further comprises:

a master instruction transmitting unit for sending control instructions to the slaves.

There is at least one passive optical dividing component connected between the master and individual slaves for transmitting downstream data from the master to each slave and for gathering and transmitting upstream data from the slaves to the master.

The present disclosure has the following benefits:

The present disclosure focuses on the OLT managing ONTs via OMCI by reporting the ME Support List ME for the ONTs to the OLT. Whatever management protocol is adopted by the OLT to manage the ONTs, e.g. the GPON protocol or an Ethernet PON (EPON) protocol, the present disclosure can avoid the defects with the prior art as long as the ONTs can generate a ME Support List ME to describe the managed entities supported by the ONTs based on the hardware configuration of the ONTs and allow the OLT to obtain such information. The method of the present disclosure allows shortening the ONT service clearance time by quickly identifying incompatibility of the OLT with the ONTs.

DETAILED DESCRIPTION

Figure 1:
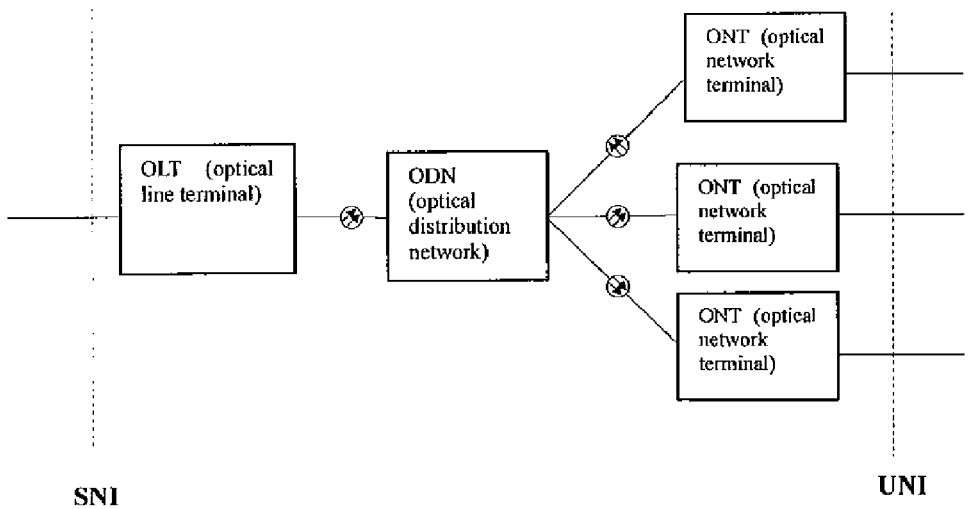
FIG. 1 is a block diagram showing one embodiment of a PON system.
Figure 2:
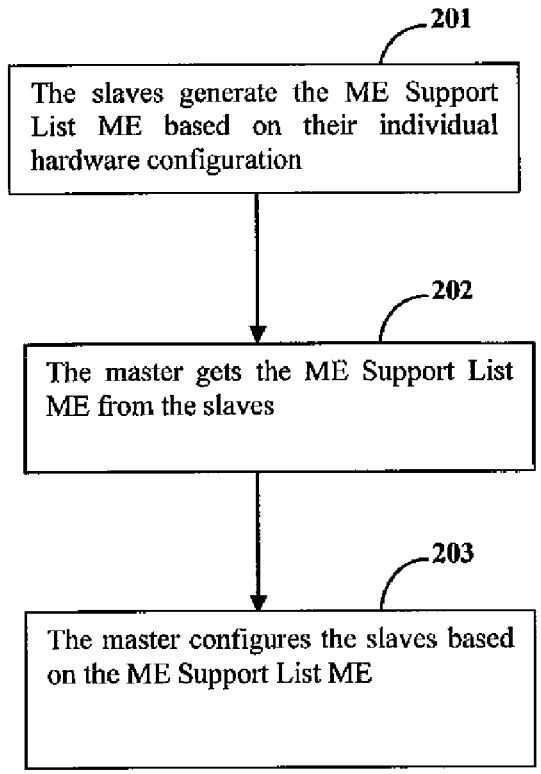
FIG. 2 is a flowchart depicting one embodiment of the method of the present disclosure.

The present disclosure provides a method for the master to configure the slaves for use in a PON system as shown in FIG. 2, comprising:

201. the slaves generating the ME Support List ME based on their individual hardware configuration;

202. the master obtaining the ME Support List ME from the slaves; and 203. the master configuring the slaves based on the ME Support List ME.

Figure 3A:
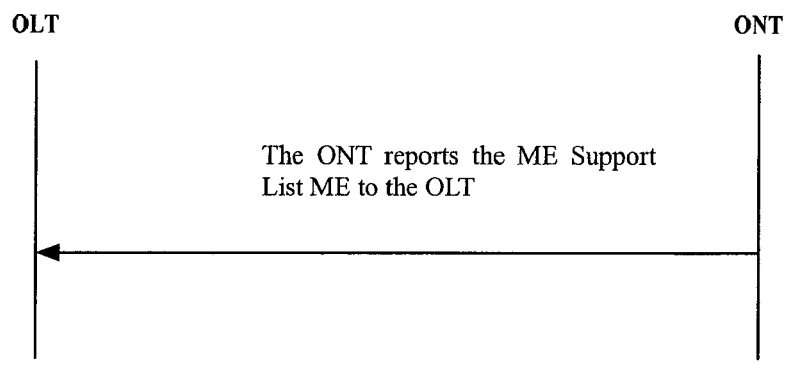
FIG. 3A is a flowchart illustrating one example of the method of the present disclosure.
Figure 3B:
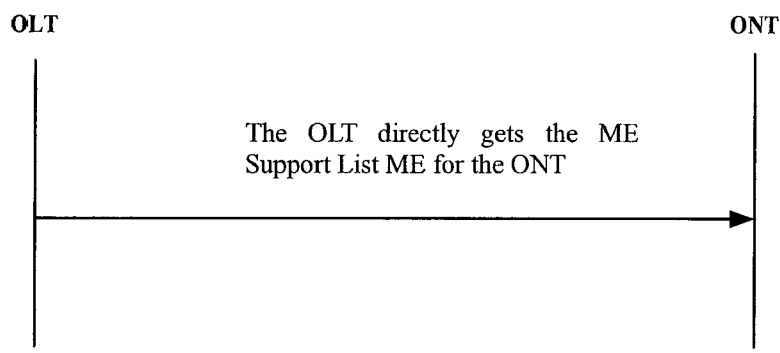
FIG. 3B is a flowchart illustrating another example of the method of the present disclosure.
Figure 3C:
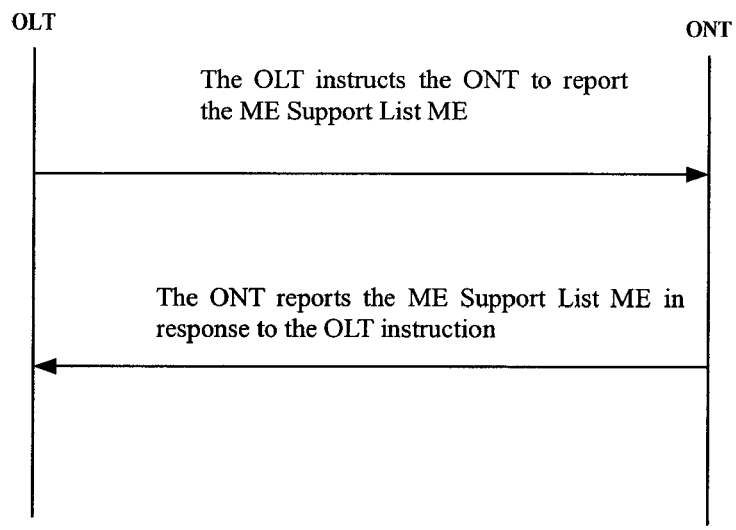
FIG. 3C is a flowchart illustrating a third example of the method of the present disclosure.

This example describes the present disclosure using the OLT as the master and the ONT as the slave. The method of the present disclosure allows the ONTs in the PON system to automatically generate the ME Support List ME. That is, numbering the supported MEs based on their individual hardware configuration when the ONTs are initialized or have a hardware change, or before or during the configuration. Once the list is generated and depending on the system configuration, the OLT may obtain the current ME list for the ONTs, e.g. the collection of the ME classes (referred to as the ME hereinafter) supported by the ONT in three ways:

a. Referring to FIG. 3A, the slave ONT automatically reports, without being asked, the generated ME to the master OLT;

b. Referring to FIG. 3B, the master OLT directly gets the ME generated by the slave ONT through the Get operation during initialization; and c. Referring to FIG. 3C, the master OLT sends an instruction to the slave ONT directing the latter to report the ME, and the ONT reports the ME to the OLT in response to the command.

In the above three methods, information exchange between the ONTs and the OLT is made through passive optical dividing components, and the ONTs may use the MIB Upload or Get Response message for the OMCI standard to report the ME. Upon receiving either message, the OLT knows the ME collection currently generated by the ONT.

The method of the present disclosure allows the ONT to create a special ME class to describe the various MEs it supports. For example, if M classes of MEs are supported locally, N classes of MEs may be created in response to the Create message received from the OLT. In the above Step 201, the ONT creates the special ME class, and the OLT obtains the special ME class through one of the three methods described above. The OLT knows various MEs supported by the ONT simply by resolving this special ME class and is able to do the subsequent service configuration based on this information so that no ONT incompatible Create messages are initiated from the OLT.

The above method is further described below in conjunction with a specific application.

In the system, there is one OLT and a plurality of ONTs (A, B and C). When the ONTs are initialized or experience a hardware change, the ONTs will generate a new ME to describe the various MEs supported by the ONTs based on their current hardware configuration.

For example, if ONT A supports an Ethernet port whose attributes need to be configured under the control of the OLT, ONT A should support a ME for the Physical Path Termination Point Ethernet user network interface (UNI). In the GPON protocol, the ME for the Physical Path Termination Point Ethernet UNI is numbered 11. The ONT may adopt one of the above three methods to inform the OLT that it supports the ME for the Physical Path Termination Point Ethernet UNI so that the OLT is able to configure the attributes for the Ethernet port in the ONT.

In another example, ONTs B and C support the Plain Old Telephone Service (POTS) port. In the GPON protocol, the ME for the Physical Path Termination Point POTS UNI is numbered 53, and therefore ONT B and C should support ME number 53.

In still another example, ONT A supports creating the ME for the Multicast GEM Interworking Termination Point from the OLT. This class of ME is numbered 281, and both ONT B and C do not support creating this class of ME. The difference in MEs between ONT A and ONTs B and C may be due to different equipment models or different manufacturers, and this is unknown to the OLT in advance. In this case, ONT A supports creating ME class number 281 and ONT B and C do not support creating ME class number 281.

In the present disclosure, all ONTs (A, B, and C) generate a special ME class, e.g. ME Support List ME, and here we assume it is numbered 400. All of the ONTs (A, B and C) support ME class number 400.

The following further defines the ME class numbered 400. The content of the ME is a collection of ME numbers, which are supported or whose creation is supported by the ONT. The specific attribute should include a total and listing data structure that lists the ME numbers that are supported or whose creation is supported by the ONT.

The following table shows the content of the ME Support List ME number 400:

| | |
|---|---|
| Number of ME classes support by the ONT | This attribute is used to represent the number of ME classes supported by the ONT. |
| ONT supports ME class 1 numbers | This attribute is used to represent that the ONT supports ME class 1 numbers, which may directly quote standard ME class numbers or may be new ME class numbers defined by the user. |
| ONT supports ME class 2 numbers | This attribute is used to represent that the ONT supports ME class 2 numbers, which may directly quote standard ME class numbers or may be new ME class numbers defined by the user. |
| ... | ... |
| ONT supports ME class n numbers | This attribute is used to represent that the ONT supports ME class n numbers, which may directly quote standard ME class numbers or may be new ME class numbers defined by the user. |

As described and defined in the above, the OLT may obtain the ME collection for ONTs A, B and C in three ways, as shown in the following table.

| ONT number | Description of ME collection | Content of ME Support List ME |
|---|---|---|
| ONT A | ME Support List ME number 400 Physical Path Termination Point Ethernet UNI ME number 11 | {Number of supported ME classes is 5, 11, 281, ... } |
| ONT B | ME Support List ME number 400 and Physical Path Termination Point POTS UNI ME number 53 | {Number of supported ME classes is 10, 53, ... } |
| ONT C | ME Support List ME number 400 and Physical Path Termination Point POTS UNI ME number 53 | {Number of supported ME classes is 15, 53, ... } |

Once the OLT gets the information shown in the above table, it knows the ME classes supported by ONTs A, B and C, or more exactly, it knows the hardware capability and service support capability of ONTs A, B and C. This information will help the OLT to deploy the ONTs and configure the service attributes for the ONTs. For example, the OLT knows that ONT A supports the Ethernet port and multicast service corresponding to the Multicast GEM Interworking Termination Point ME, and that ONT B and C support the POTS port and POTS services.

The OLT user can see the ME Support List ME for ONTs A, B and C from the management interface (command lines or graphic interface), and knows that ONT A supports the Ethernet port while ONTs B and C support the POTS port. The user can then configure ONT A with the Ethernet port related attributes, such as self-negotiation and rate selection including 10 Megabits per second (Mbps) or 100 Mbps, and configure ONTs B and C with the POTS port related attributes, such as load impedance and gain.

In particular, when the user configures ONTs B and C with multicast service, the OLT resolves the user command and finds out that there is a need to create the Multicast GEM Interworking Termination Point ME number 281 on ONTs B and C. As the ME collection for ONTs B and C does not include the number 281 ME, the OLT may directly prompt the user that ONTs B and C do not support multicast service.

From the above, we can see that the method of the present disclosure allows the master to obtain the ME Support List for the slaves so that services can be accurately executed and the master knows exactly what services are supported by the slaves.

The three methods in which the master obtains the ME Support List for the slaves are described in greater detail below.

The first method, A, is shown in FIG. 3A. The ONTs automatically report without being asked the attribute value for the ME collection, e.g. the total number of MEs supported by the ONTs and the list of ME class numbers, as shown in the above table.

The second method, B, is shown in FIG. 3B. The OLT directly obtains the attributes of the ME collection for the ONTs through the Get operation. This method allows the OLT to directly read the ME collection from the ONTs and has the same technical result as the first method.

The third method, C, is shown in FIG. 3C. The OLT asks the ONTs to initiate the MIB upload and the work flow is:

1. The OLT informs the ONTs of its intention to get the value of the ME Support List ME through the GET command, and sends parameters such as the ME Support List ME numbers and the instance numbers.

2. The ONTs report the value of the ME Support List ME to the OLT in response to the GET command received from the OLT.

As described above, the method of the present disclosure can speed up the service clearance of the ONTs, and quickly identify incompatibility between the OLT and the ONTs as the OLT is informed in advance of the ME classes supported by the ONTs. For example, the OLT can identify compatibility problems with the ONTs by comparing its own ME Support List with that of the ONTs. In the absence of the method of the present disclosure, the OLT must send a Create message to the ONTs to get a response message. If the response message indicates a failure, the OLT must first rule out the possibility of a communication fault and an ONT fault before the OLT can determine that the problem is a compatibility problem.

Figure 4:
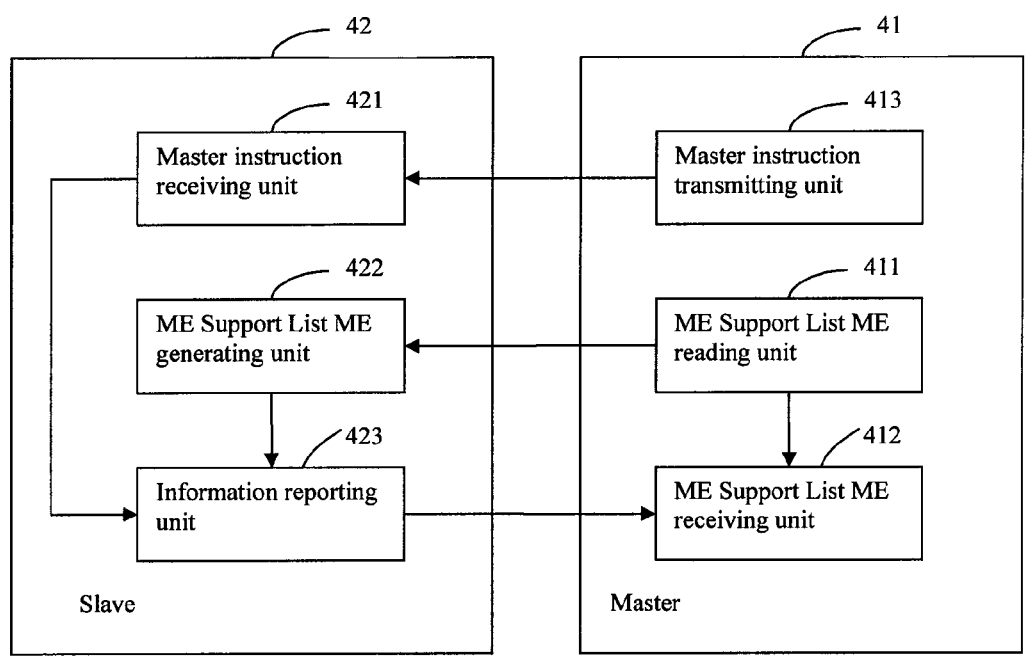
FIG. 4 is a block diagram showing one embodiment of the composition of a slave and a master in the system of the present disclosure.

Furthermore, the present disclosure provides a passive optical network (PON) system comprising a master 41 and a plurality of slaves 42 as shown in FIG. 4, wherein each of the slaves comprises:

a master instruction receiving unit 421 for receiving instructions from the master 41;

an ME Support List ME generating unit 422 for generating the ME Support List ME based on the hardware configuration of the slaves; and an information reporting unit 423 for reporting the ME Support List ME generated by the ME Support List ME generating unit 422 to the master 41 in response to the instructions received by the master instruction receiving unit 421.

Wherein the master 41 comprises at least:

an ME Support List ME reading unit 411 for reading the ME Support List ME generated by the slaves.

The master 41 further comprises:

an ME Support List ME receiving unit 412 for receiving the ME Support List ME from the information reporting units 423 of the slaves; and a master instruction transmitting unit 413 for sending control instructions to the slaves 42.

In this embodiment, there is at least one passive optical dividing component connected between the master 41 and a plurality of slaves 42 for transporting the downstream data from the master 41 to individual slaves 42. The optical dividing component is connected to the master and slaves in the same way, works in the same way as the prior art, and need not to be described in greater detail.

In actual application, the ME Support List ME generating unit 422 of the slaves 42 generates the ME Support List ME based on the hardware configuration of the slaves 42 when the system is initialized or when the slaves 42 have a hardware configuration change. The information reporting unit 423 reports the ME Support List ME generated by the ME Support List ME generating unit 422 to the master 41.

The system of the present disclosure may allow the ME Support List ME reading unit 411 of the master 41 to automatically read the ME Support List ME generated by the slaves 42. Additionally, the system of the present disclosure may allow the master instruction transmitting unit 413 of the master 41 to send an instruction for reading the generated ME Support List ME to the master instruction receiving unit 421 of the slaves 42. The master instruction receiving unit 421 of the slaves 42 receives the instruction and the information reporting unit 423 forwards the ME Support List ME generated by the ME Support List ME generating unit 422 to the ME Support List ME receiving unit 412 of the master 41.

As described above, the system of the present disclosure allows the slaves to send service quicker than is possible with the prior art, and is a solution to the technical problem of poor communication between the master and the slaves found with the prior art.

It will be apparent to those skilled in the art that changes or variations to the present disclosure can be made without departing from the spirit and scope thereof. Therefore, if these changes and variations to present disclosure are subject to the claims of present disclosure and equivalent technical scope, then the intent of present disclosure also includes these changes and variations.

What is claimed is:

1. A passive optical network (PON) component comprising a processor configured to implement a method comprising:

obtaining a new managed entity (ME) from a slave, the new ME comprising a plurality of numbers that each represent a ME supported by the slave; and configuring the slave based on the new ME.

2. The component of claim 1 wherein obtaining the new ME and the configuring the slave occur over a passive optical distribution network.

3. The component of claim 1 wherein obtaining the new ME comprises receiving a list of the numbers from the slave without requesting the list from the slave.

4. The component of claim 3 wherein obtaining the new ME and the configuring the slave occur over a passive optical distribution network.

5. The component of claim 1 wherein obtaining the new ME comprises sending a command to the slave asking for a list of the numbers, and receiving the list in response to the command.

6. The component of claim 5 wherein obtaining the new ME and the configuring the slave occur over a passive optical distribution network.

7. The component of claim 1 wherein obtaining the new ME comprises getting a list of the numbers.

8. The component of claim 1 wherein the MEs supported by the slave comprise a Physical Path Termination Point Ethernet User Network Interface (UNI) ME, a Physical Path Termination Point Plain Old Telephone Service (POTS) UNI ME number, and a Multicast Gigabit PON (GPON) Encapsulation Method (GEM) Interworking Termination Point ME.

9. A passive optical network (PON) network comprising a slave comprising:

a receiving unit configured to receive instructions from a master;

a generating unit configured to generate a managed entity (ME) support list ME based on the configuration of the slave; and a reporting unit configured to report the ME support list ME to the master in response to the instructions received by the receiving unit.

10. The network of claim 9 further comprising the master, wherein the master comprises a reading unit configured to read the ME support list ME generated by the slave.

11. The network of claim 10 wherein the master further comprises a master receiving unit configured to receive the ME support list ME from the reporting unit.

12. The network of claim 11 wherein the master further comprises a transmitting unit configured to send the instructions to the slave.

13. The network of claim 9 further comprising the master, wherein the master comprises a master receiving unit configured to receive the ME support list ME from the reporting unit.

14. The network of claim 13 wherein the master further comprises a transmitting unit configured to send the instructions to the slave.

15. The network of claim 9 further comprising a passive optical dividing component between the master and the slave, wherein the passive optical dividing component is configured to transmit downstream data from the master to the slave, and transmit upstream data from the slave to the master.

16. A passive optical network (PON) component comprising a processor configured to implement a method comprising:

generating a list of supported managed entities (MEs) based on the configuration of the PON component, the list of supported MEs comprising a plurality of numbers that each represent a ME supported by the PON component; and sending the list of supported MEs to a master.

17. The component of claim 16 wherein generating the list of supported MEs and sending the list of supported MEs occur over a passive optical distribution network.

18. The component of claim 16 wherein sending the list of supported MEs comprises reporting the list of supported MEs to the master without receiving a request from the master to report the list of supported MEs.

19. The component of claim 18 wherein generating the list of supported MEs and sending the list of supported MEs occur over a passive optical distribution network.

20. The component of claim 16 wherein sending the list of supported MEs comprises receiving a command asking for the list of supported MEs, and reporting the list of supported MEs to the master in response to the command.

21. The component of claim 20 wherein generating the list of supported MEs and sending the list of supported MEs occur over a passive optical distribution network.

\* \* \* \* \*